US005202024A

United States Patent [19]

Andersson et al.

[11] Patent Number: 5,202,024

[45] Date of Patent: Apr. 13, 1993

[54] CENTRIFUGAL SEPARATOR

[75] Inventors: Per-Olof Andersson, Västerhaninge; Bengt Lahti, Södertälje; Otto Hellekant, Rönninge, all of Sweden

[73] Assignee: Alfa-Laval Separation AB, Tumba, Sweden

[21] Appl. No.: 879,555

[22] Filed: May 4, 1992

Related U.S. Application Data

[63] Continuation of Ser. No. 655,391, Feb. 12, 1991, filed as PCT/SE90/00374, May 31, 1990, abandoned.

[30] Foreign Application Priority Data

Jun. 13, 1989 [SE] Sweden ............................... 8902127

[51] Int. Cl.[5] ............................................ B01D 24/32

[52] U.S. Cl. ................................... 210/360.1; 55/276

[58] Field of Search .................. 55/276, 406; 418/181; 210/360.1; 181/205, 225, 264

[56] References Cited

U.S. PATENT DOCUMENTS 938,101 10/1909 Winters ............................... 181/264

1,926,528 9/1933 Cornell, Jr. ........................... 252/50

2,560,874 7/1951 Kelso .................................... 55/408

3,058,720 10/1962 Hart et al. ............................. 55/408

3,477,541 11/1969 Thunholm ............................ 181/33

4,761,115 8/1988 Hopfensperger ..................... 415/11

4,820,257 4/1989 Ishimaru .............................. 494/16

FOREIGN PATENT DOCUMENTS

WO86/06006 10/1986 PCT Int'l Appl. .

*Primary Examiner*—Bernard Nozick

*Attorney, Agent, or Firm*—Seidel, Gonda, Lavorgna & Monaco

[57] ABSTRACT

Centrifugal separator includes a rotor, which is arranged in a gas containing chamber and which on its outside surface is provided with a number of cavities located at a distance from each other and open to the chamber. In order to disturb the generation of sound waves in the cavities at the resonant frequency of the cavities, an irregularity, preferably in the shape of a projection, is arranged nearby and in front of at least one cavity in the rotational direction of the rotor.

20 Claims, 3 Drawing Sheets

CENTRIFUGAL SEPARATOR

This applicant is a continuation of Ser. No. 655,391 filed Feb. 12, 1991, filed as PCT/SE90/00374, May 31, 1990, now abandoned.

FIELD OF THE INVENTION

The present invention relates to centrifugal separators, more precisely to centrifugal separators, the rotors of which are arranged rotatably in a gas containing chamber and on the outside are provided with a number of cavities, which cavities during operation of the rotor are open to the chamber.

BACKGROUND OF THE INVENTION

A centrifugal separator for separating constituents in a liquid mixture supplied thereto typically comprises a rotor having an inlet for receipt of the feed mixture, a separation chamber and at least one outlet for discharge of each of the separated constituents from the separation chamber. The rotor may be arranged to rotate in a gas containing chamber.

Centrifugal separators of this kind generate a sound, which in many cases exceeds the sound level, which can be accepted. In particular, this is the case in centrifugal separators, the rotors of which during operation rotates at a relatively high number of revolutions.

In WO 86/06006 a centrifugal separator is disclosed, which has a rotor of this kind. This rotor is arranged in a gas containing chamber and has a number operation of such a centrifugal separator to an acceptable level. The sound of the centrifugal separator is generated inter alia as wave movements in the gas which is present in said openings.

BRIEF SUMMARY OF THE INVENTION

The object of the present invention is to accomplish a rotor, which generates essentially less sound than hitherto known rotors even at relatively high operational number of revolutions.

The solution according to the invention is based upon the understanding that the wave movements in the gas present in the cavities often are responsible for a great deal of the sound generated by the rotor and that these wave movements are generated by the gas, which is present in the chamber and during operation of the rotor is passed by the openings of the cavities towards the chamber.

In order to achieve a reduction of the sound level of the sound generated by a rotor of the kind initially described, there is suggested according to the present invention that the outside of the rotor has at least one irregularity disturbing the generation of a tone nearby and in front of one of the cavities seen in the rotational direction of the rotor. The irregularities are so designed that the creation of wave movements in the cavities of the resonance frequency of the cavities is disturbed.

Hereby, the gas flow at the opening of the cavity is disturbed in a way such that the sound level of the tone of the resonance frequency, which the gas flow generates in the cavity is reduced considerably or completely eliminated.

The irregularity is preferably equally distributed around the rotor. Suitably, the outside of the rotor has one irregularity in front of each cavity.

In a preferred embodiment of the invention, the irregularity consists of a projection projecting radially outward from the outside of the rotor in the shape of a fin, the longitudinal direction of which essentially coincides with the rotational direction of the rotor. In this embodiment, it is beneficial if the projections or fins extend in the rotational direction from one cavity to an adjacent cavity. If the projections consist of fins, the irregularities easily can be made during manufacturing when turning the outside of the rotor.

In an alternative embodiment the irregularity consists of a recess, which is arranged on the outside of the rotor in front of the cavities.

BRIEF DESCRIPTION OF THE DRAWINGS

In the following, the invention will be described with reference to the accompanying drawings, in which.

DETAILED DESCRIPTION OF THE INVENTION

Figure 1:
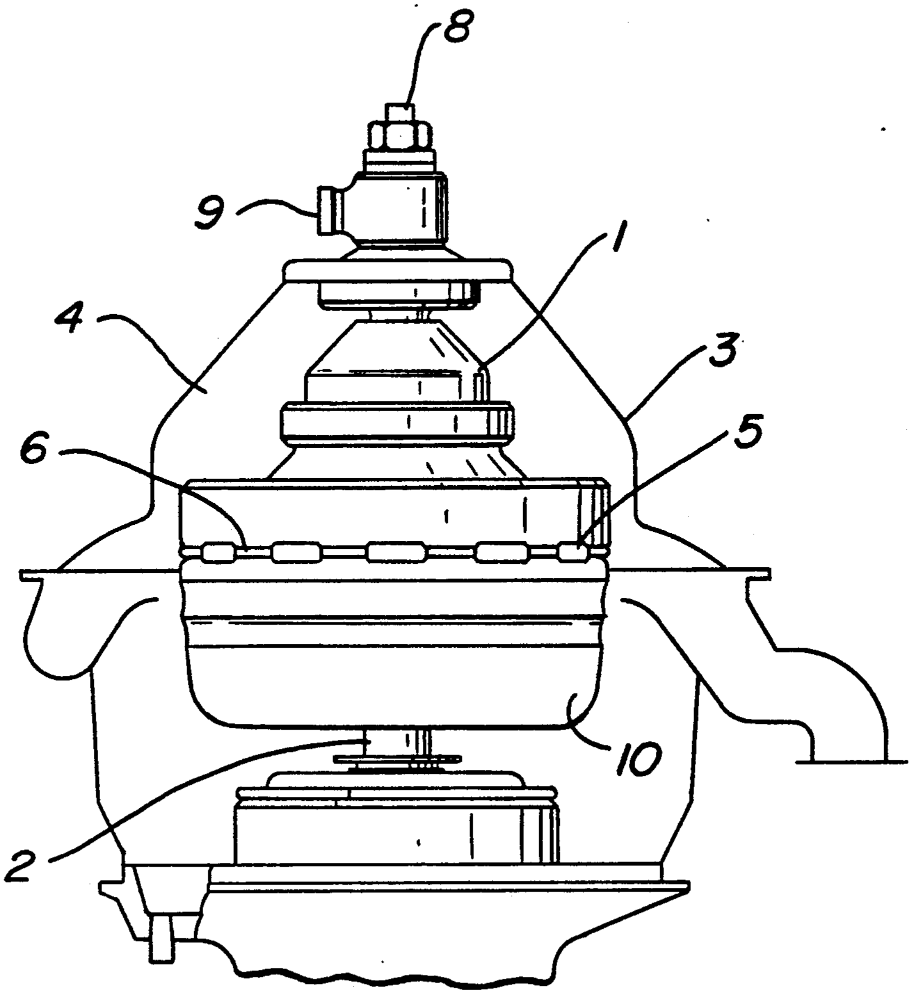
FIG. 1 shows partly in a side view and partly in section a part of a centrifugal separator, FIG. 2 schematically shows an axial section through a part of a centrifugal separator according to the invention, and FIG. 3 schematically shows a part of a radial section through a centrifugal separator according to the invention.
Figure 2:
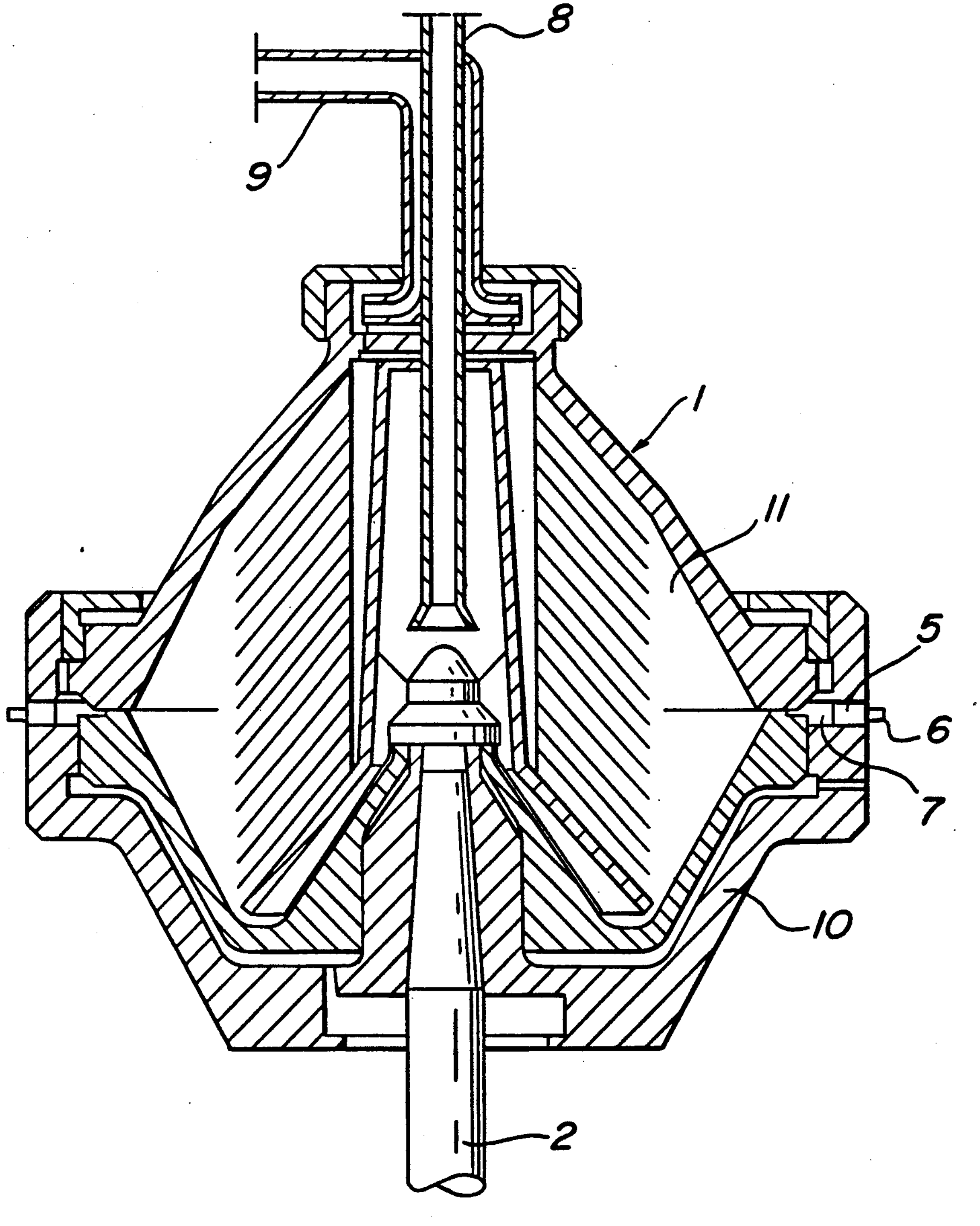

The centrifugal separator shown in FIG. 1 has a rotor 1, which is driven and supported by a vertical shaft 2. The rotor 1 includes a casing 10 which, as seen in FIG. 2, defines a separation chamber 11. The rotor is surrounded by a stationary casing 3, which forms a gas containing chamber 4, in which the rotor rotates. A number of cavities 5 are arranged on the outside of the rotor, which are open to the chamber 4 and located at a distance from each other in the rotational direction of the rotor. In the shown embodiment these cavities consist of openings, which are equally distributed around the rotor. Through these openings a component separated in the rotor is thrown out intermittently. Between these openings, projections 6 are arranged to disturb the creation of wave movements in the cavities of the resonance frequency of the cavities. Preferably, these projections are arranged nearby and in front of each opening seen in the rotational direction of the rotor, but in the shown example the projection 6 consists of fins extending from one opening to an adjacent opening. The longitudinal direction of these fins coincides with the rotational direction of the rotor.

With further reference to FIG. 1, there is shown a central inlet 8 for a liquid feed mixture which is to be centrifugally treated within the rotor 1. Also shown is an outlet 9 for a liquid component of the feed which has been separated by the centrifugal force. Additional outlets may be provided, if desired, for other components of the feed that may be separated.

In FIG. 2 there is shown schematically an axial section through a rotor of a centrifugal separator, which is designed in accordance with the present invention. As the embodiment shown in FIG. 1, this rotor has a number of cavities 5 in the shape of openings arranged equally distributed around the rotor on its outside. Radially inside the openings 5 the rotor has a connection 7 extending around the rotational axis of the rotor and connecting the different openings or cavities 5 to each other. On the outside of the rotor nearby and in front of each opening 5, seen in the rotational direction, a projection 6 is arranged in the shape of a fin as in the embodiment shown in FIG. 1.

Figure 3:
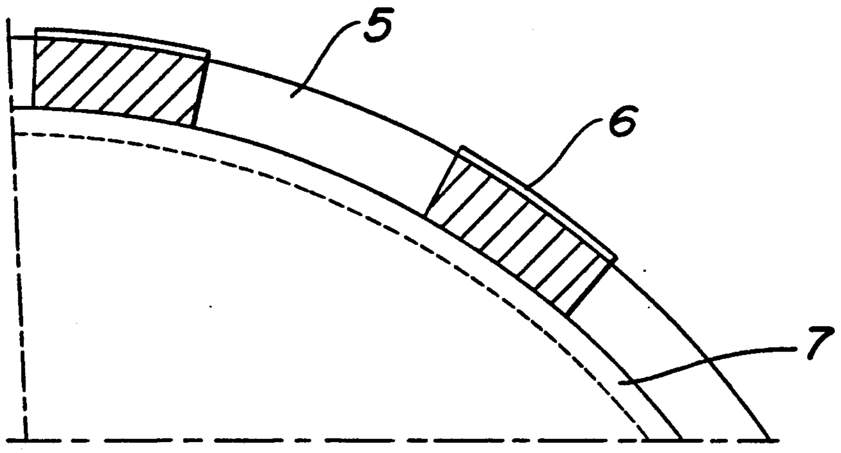

In FIG. 3, there is shown schematically a part of a radial section through the rotor shown in FIG. 2. This section extends through the openings 5 and is seen towards the fins 6. In this figure, the said connection is schematically marked.

By designing a centrifugal separator in the described manner, the flow pattern at the front edge of the cavities is disturbed for the gas present in the chamber 4, which is passed by the cavities 5.

We claim:

1. A centrifugal separator for separating constituents of a liquid mixture supplied thereto, comprising a rotor, the rotor having a casing and rotated about its central longitudinal axis, means forming an inlet for receipt of the liquid feed mixture into the rotor casing, the rotation of the rotor separating the liquid feed mixture into heavy and light constituent parts thereof, an outlet for discharge of the light and heavy constituent parts of the feed mixture from the rotor casing, the rotor arranged in a gas-containing chamber, the rotor casing having a number of cavities positioned on the outside surface of the rotor and located at a distance from each other in the rotational direction of the rotor, the cavities open to the chamber during the rotation of the rotor, the outside of the rotor casing having at least one irregularity means thereon for disturbing the generation of a tone nearby and in front of the cavity in the rotational direction of the rotor, the irregularity means disturbing the resonance frequency of the wave movement in the cavity.

2. A centrifugal separator according to claim 1, wherein said irregularity means consists of a recess.

3. A centrifugal separator according to claim 1, wherein the cavities are equally distributed around the rotor.

4. A centrifugal separator according to claim 3, wherein said irregularity means consists of a recess.

5. A centrifugal separator according to claim 3, wherein the outside of the rotor has one irregularity means in front of each cavity.

6. A centrifugal separator according to claim 5, wherein the irregularity means consists of a projection projecting radially outward from the outside of the rotor.

7. A centrifugal separator according to claim 6, wherein the projection consists of a fin, the longitudinal direction of which coincides with the rotational direction of the rotor.

8. A centrifugal separator according to claim 6, wherein the projection extends in the rotational direction of the rotor from one cavity to an adjacent cavity.

9. A centrifugal separator according to claim 3, wherein the irregularity means consists of a projection projecting radially outward from the outside of the rotor.

10. A centrifugal separator according to claim 9, wherein the projection consists of a fin, the longitudinal direction of which coincides with the rotational direction of the rotor.

11. A centrifugal separator according to claim 10, wherein the projection extends in the rotational direction of the rotor from one cavity to an adjacent cavity.

12. A centrifugal separator according to claim 1, wherein the outside of the rotor has one irregularity means in front of each cavity.

13. A centrifugal separator according to claim 12, wherein said irregularity means consists of a recess.

14. A centrifugal separator according to claim 12, wherein the irregularity means consists of a projection projecting radially outward from the outside of the rotor.

15. A centrifugal separator according to claim 14, wherein the projection consists of a fin, the longitudinal direction of which coincides with the rotational direction of the rotor.

16. A centrifugal separator according to claim 14, wherein the projection extends in the rotational direction of the rotor from one cavity to an adjacent cavity.

17. A centrifugal separator according to claim 1, wherein said irregularity means consists of a projection projecting radially outward from the outside of the rotor.

18. A centrifugal separator according to claim 17, wherein said projection extends in the rotational direction of the rotor from one cavity to an adjacent cavity.

19. A centrifugal separator according to claim 17, wherein said projection consists of a fin, the longitudinal direction of which coincides with the rotational direction of the rotor.

20. A centrifugal separator according to claim 19, wherein the projection extends in the rotational direction of the rotor from one cavity to an adjacent cavity.

* * * * *